United States Patent [19]

Bopp et al.

[11] Patent Number: 5,064,869

[45] Date of Patent: Nov. 12, 1991

[54] POLYPHENLENE ETHER FOAMS FROM LOW I.V. POLYPHENYLENE ETHER EXPANDABLE MICROPARTICLES

[75] Inventors: Richard C. Bopp, West Coxsackie, N.Y.; Lynn M. Martynowicz, Pittsfield, Mass.

[73] Assignee: General Electric Company, Selkirk, N.Y.

[21] Appl. No.: 456,674

[22] Filed: Dec. 27, 1989

[51] Int. Cl.$^5$ .................. C08J 9/232; C08J 9/18
[52] U.S. Cl. ........................ 521/60; 521/56; 521/139; 521/180
[58] Field of Search ............ 521/56, 60, 139, 180

[56] References Cited

U.S. PATENT DOCUMENTS

| 3,250,834 | 5/1966 | Collins | 264/53 |
|---|---|---|---|
| 4,303,756 | 12/1981 | Kajimura et al. | 521/59 |
| 4,385,016 | 5/1983 | Gwinn | 264/37 |
| 4,386,165 | 5/1983 | Suh | 521/79 |
| 4,442,232 | 4/1984 | Kajimura et al. | 521/56 |
| 4,459,373 | 7/1984 | Hahn et al. | 521/56 |
| 4,532,263 | 7/1985 | Krutchen et al. | 521/133 |
| 4,606,873 | 8/1986 | Biglione et al. | 264/53 |
| 4,661,386 | 4/1987 | Digiulio | 428/35 |
| 4,684,669 | 8/1987 | Wroczynski | 521/139 |
| 4,727,093 | 2/1988 | Allen et al. | 521/139 |
| 4,728,674 | 3/1988 | Wroczynski | 521/139 |
| 4,782,098 | 11/1988 | Allen et al. | 521/81 |
| 4,927,858 | 5/1990 | Joyce et al. | 521/59 |
| 4,927,859 | 5/1990 | Weber et al. | 521/56 |

FOREIGN PATENT DOCUMENTS 3220856 12/1982 Fed. Rep. of Germany .
1062307 3/1967 United Kingdom .

OTHER PUBLICATIONS

Frisch and Saunders, ed., "Plastic Foams", Marcel Delker, Inc., NY Part II, pp. 525-625, 1973.

Primary Examiner—Morton Foelak
Attorney, Agent, or Firm—Hedman, Gibson, Costigan & Hoare

[57] ABSTRACT

Expandable thermoplastic resin microparticle compositions comprising low intrinsic viscosity polyphenylene ethers and a method for producing foam therefrom are disclosed.

19 Claims, No Drawings

POLYPHENLENE ETHER FOAMS FROM LOW I.V. POLYPHENYLENE ETHER EXPANDABLE MICROPARTICLES

The present invention relates to expandable thermoplastic resin particles comprising low intrinsic viscosity polyphenylene ether resins or low intrinsic viscosity polyphenylene ether resin blends. The present invention also relates to a method for reducing molding pressures and improving the apparent diffusion rate of an imbibed blowing agent employing low intrinsic viscosity polyphenylene ether resins and blends thereof.

BACKGROUND OF THE INVENTION

It is known in the art to produce thermoplastic resin particles imbibed with a blowing agent for expansion at a later time. In the case of polyphenylene ether foam products, generally a blowing agent such as pentane is impregnated under pressure in polyphenylene ether. The impregnated particles are then heated, usually in steam and the particles foam. The foamed particles can then be placed in a mold and heated again to the point where the particles fuse. The result is a quite rigid low density product which has many uses from packaging to insulating board.

There are also many disclosures in the art for imbibing polystyrene resin particles. Early processes are summarized in Frisch & Saunders, "*Plastic Foams*", Marcel Deleker, Inc., N.Y., 1973, Part II, pp. 525–544, such as diffusion of blowing agents into polystyrene, polymerization of styrene solutions of volatile hydrocarbons, suspension polymerization systems, deposition of expandable polystyrene from solution, quenched-pellet processes and water-in-monomer polymerizations.

There have been a variety of attempts to produce expandable pellets by incorporating the blowing agent in a polymer melt in an extruder and cutting the extrudate into pellets. Collins, in U.S. Pat. No. 3,250,834 extrudes strands of polystyrene containing pentane into grooves onto rotating rolls maintained at a temperature below the expanding temperature of the extruded material. Other disclosures employ underwater pelletizers, see e.g. Biglione et al, U.S. Pat. No. 4,606,873; Gwinn, U.S. Pat. No. 4,385,016; Muirhead et al, United Kingdom U.S. Pat. No. 1,062,307; Suh, U.S. Pat. No. 4,386,165; and Allen et al in commonly assigned U.S. Patent Application, Ser. No. 093,317, filed Sept. 4, 1981. Hambrecht et al in German Patent DE 3,220,856 discloses melting a polyphenylene ether/polystyrene blend and mixing with a blowing agent at a pressure of 25 to 250 bars, but does not describe making expandable pellets.

It is also known to incorporate a blowing agent into the thermoplastic resin during polymerization. Kajimura et al, U.S. Pat. No. 4,442,232 teaches the addition of the blowing agent to the reaction system in the production of expandable styrene-maleic anhydride copolymers. See also Hahn et al, U.S. Pat. No. 4,459,373.

At present the most common method is to impregnate the thermoplastic particles with blowing agent in a suspension. Kajimura et al, U.S. Pat. No 4,303,756 describes impregnating thermoplastic resin beads with blowing agent in an aqueous suspension under pressure. Krutchen et al, in U.S. Pat. No. 4,532,263 discloses imbibing polyetherimide resins in an excess of a solvent selected from the group consisting of methylene chloride, chloroform and 1,1,2-trichloroethane at temperatures up to about 100° F. DiGiulio, U.S. Pat. No. 4,661,386 discloses carrying out the impregnation of pentane in polystyrene in a slurry of water at 90° C. stabilized by finely divided calcium phosphate and an anionic surfactant. Allen et al, in commonly assigned U.S. Pat. No. 4,782,098 discloses suspending the thermoplastic resin beads in water containing a suspending agent in an autoclave, heating the suspension and introducing the blowing agent under pressure to produce the expandable thermoplastic beads.

None of these imbibing processes however teach the use of a low intrinsic viscosity (I.V.) polyphenylene ether as the thermoplastic resin and the advantages associated therewith. All intrinsic viscosity values employed in this specification are measured in chloroform at 25° C. unless otherwise indicated. By low intrinsic viscosity is meant, polyphenylene ethers having an I.V. of less than 0.45 dl/g, preferably less than about 0.40 dl/g, and more preferably less than about 0.30 dl/g. The most preferred polyphenylene ether resin is one having an I.V. of from about 0.10 dl/g to about 0.30 dl/g. Surprisingly, when lower I.V. polyphenylene ethers are employed in producing expandable microparticles, there results a significant decrease in molding cycle times, molding pressures and in the amount of residual blowing agent in the final molded part.

Low intrinsic viscosity polyphenylene ether foamable resins are disclosed in Allen et al commonly assigned U.S. Pat. No. 4,727,093 which describes a process for making low density polyphenylene ether/polystyrene foams with polyphenylene ethers having an intrinsic viscosity of about 0.1 to 0.7 dl/g, out does not teach producing expandable beads or the advantages associated therewith. Allen et al in commonly assigned U.S. Patent Application, Ser. No. 093,317, filed Sept. 4, 1987, broadly describes an underwater pelletizing process for producing expandable beads employing polyphenylene ether resins having an I.V. of about 0.1 to about 0.7 dl/g, but does not teach the molding advantages associated with employing polyphenylene ether resins having an I.V. of less than about 0.45 dl/g.

SUMMARY OF THE INVENTION

According to the present invention there is provided an expandable thermpolastic resin composition comprising microparticles, the microparticles comprising (a) a polyphenylene ether resin having an intrinsic viscosity of less than about 0.45 dl/g, optionally in combination with a polystyrene resin; and (b) an effective amount of an imbibed blowing agent. The preferred polyphenylene ether is poly(2,6-dimethyl-1,4-phenylene)ether. Preferred polystyrenes are a styrene-maleic anhydride copolymer, principally atactic polystyrene and high impact polystyrene. Preferably the blowing agent is selected from straight-chain, branched, cyclic or halogenated hydrocarbons, chlorofluorocarbons, carbon dioxide, water, nitrogen, air, alcohols having from 1 to 5 carbon atoms, halogenated alcohols such as fluoroisopropanol and acetone. Especially preferred is n-pentane, its isomers and mixtures thereof. Most preferred is n-pentane. The blowing agent is preferably present in an amount of from about 2 to about 15 weight percent, more preferably from about 2 to about 8 weight percent, based on the weight of the polyphenylene ether and polystyrene resins combined.

It is further preferred that the polyphenylene ether resin employed has an intrinsic viscosity of less than about 0.40 dl/g and most preferred to have an intrinsic viscosity of from about 0.10 dl/g to about 0.30 dl/g.

Also according to the present invention there is provided a method for reducing molding pressures and improving the apparent diffusion rate of a blowing agent comprising:

(i) compounding a composition comprising microparticles having an average diameter of less than about 0.1 inch, said microparticles comprising
(a) a polyphenylene ether resin having an intrinsic viscosity of less than 0.45 dl/g and optionally
(b) a polystyrene resin; and
(ii) impregnating said compositions with a blowing agent;
(iii) pre-expanding said composition; and
(iv) molding said pre-expanded composition.

DETAILED DESCRIPTION OF THE INVENTION

The polyphenylene ether resin is normally a homo- or copolymer having units of the formula

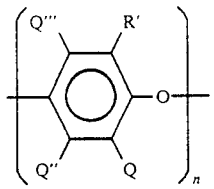

wherein Q, Q', Q", Q''' are independently selected from the group consisting of hydrogen, halogen, hydrocarbon, halohydrocarbon, hydrocarbonoxy and halohydrocarbonoxy; and n represents the total number of monomer units and is an integer of at least about 20, and more usually at least 50.

The polyphenylene ether resin can be prepared in accordance with known procedures, such as those described in Hay, U.S. Pat. Nos. 3,306,874 and 3,306,875; and Stamatoff, U.S. Pat. Nos. 3,257,357 and 3,257,358; from the reaction of phenols including but not limited to 2,6-dimethylphenol; 2,6-diethylphenol; 2,6-dibutylphenol; 2,6-dilaurylphenol; 2,6-dipropylphenol; 2,6-diphenylphenol; 2-methyl-6-tolylphenol; 2-methyl-6-methoxyphenol; 2,3,6-trimethylphenol; 2,3,5,6-tetramethylphenol; and 2,6-diethyoxyphenol.

Each of these may be reacted alone to produce the corresponding homopolymer, or in pairs or with still other phenols to produce the corresponding copolymer. Examples of the homopolymer include poly(2,6-dimethyl-1,4-phenylene)ether, poly(2,6-diethyl-1,4-phenylene)ether, poly(2,6-dibutyl-1,4-phenylene)ether, poly(2,6-dilauryl-1,4-phenylene)ether, poly(2,6-dipropyl-1,4-phenylene)ether, poly(2,6-diphenyl-1,4-phenylene)ether, poly(2-methyl-6-methoxy-1,4-phenylene)ether, poly(2-methyl-6-butyl-1,4-phenylene)ether, poly(2,6-dimethoxy-1,4-phenylene)ether, poly(2,3,6-trimethyl-1,4-phenylene)ether, poly(2,3,5,6-tetramethyl-1,4-phenylene)ether, and poly(2,6-diethyoxy-1,4-phenylene)ether. Examples of the copolymer include, especially those of 2,6-dimethylphenol with other phenols, poly(2,6-dimethyl-co-2,3,6-trimethyl-1,4-phenylene)ether and poly(2,6-methyl-co-2-methyl-6-butyl-1,4-phenylene)ether.

For the purposes of the present invention, an especially preferred family of polyphenylene ethers includes those having alkyl substitution in the two positions ortho to the oxygen ether atom, i.e. those of the above formula wherein Q and Q' are alkyl, most preferably having 1 to 4 carbon atoms. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene) ether; and the like.

The most preferred polyphenylene ether resin for purposes of the present invention is poly(2,6-dimethyl-1,4-phenylene)ether.

The term "alkenyl aromatic polymer" as it is employed in this disclosure is intended to encompass homopolymers of styrene as well as rubber-modified high impact varieties, and also copolymers and terpolymers of an alkenyl aromatic compound with one or more other materials. Preferably, the alkenyl aromatic polymer is based at least in part on units of the formula

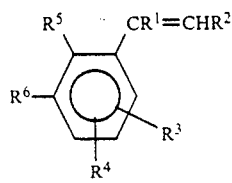

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms; or $R^5$ and $R^6$ may be concatenated together with hydrocarbyl groups to form a naphthyl group.

The above will encompass styrene, as well as homologs and analogs of styrene. Specific examples include, in addition to styrene, chlorostyrene, bromostyrene, alpha-methylstyrene, para-methylstyrene, nuclear-methylstyrene, para-tert-butylstyrene, dichlorostyrene, vinyl styrene, divinyl benzene and vinyl naphthalene. Styrene is especially preferred.

By way of illustration, the polystyrene component can be a homopolystyrene, principally atactic, or another alkenyl aromatic homopolymer which has been modified by admixture or interreaction with a natural or synthetic rubber, for example, polybutadiene, polyisoprene, EPDM rubber or silicone rubber; or it can be a copolymer or terpolymer of styrene or other alkenyl aromatic compound with an elastomeric or another material, such as block copolymers of styrene and butadiene (for example, AB, ABA, ABAB or ABABA type), including hydrogenated forms of the foregoing; a radial teleblock copolymer of styrene, butadiene and a coupling agent, including hydrogenated forms; terpolymers of acrylonitrile, styrene and butadiene (ABS); styreneacrylonitrile copolymers (SAN); and a copolymer of styrene and maleic anhydride (SMA); or it can also be an alkenyl aromatic copolymer or terpolymer which has been modified with rubber, for example rubber-modified styrene-maleic anhydride copolymer. Many of these are described in the patent literature, including Cizek, U.S. Pat. No. 3,383,435.

The polyphenylene ether (PPE) and polystyrene (PS) resins may be combined in any conventional manner. Polyphenylene ether resin will typically be in powder or pellet form and the polystyrene will typically be in pellet form. The resins may be combined by dry blending in a blender which provides a relatively uniform mixture of the resins. This mixture is typically directed to a thermoplastic extruder, usually of the single or twin screw type, where in the case of a blend the resin is compounded with sufficient temperature and shear to provide an intimate PPE/PS blend.

The product of the conventional extruder is an extrudate in the form of strands which may be quenched with cooling water. The cooled strands are then conveniently directed to a pelletizer device which provides the PPE/PS resin in particulate form for use in the present invention. Preferably the pelletizing device provides granules or micropellets consisting of cyl-.indrical or substantially spherical particles of up to about 2.0 mm average diameter. In preferred embodiments the particles possess an average diameter of less than about 0.1 inch, or less than about 0.05 inch, or less than about 0.0075 inch.

The polyphenylene ether and polystyrene resins are combinable in all proportions, e.g. from about 1 to about 99 parts by weight polyphenylene ether and from about 99 to about 1 part by weight polystyrene. It is contemplated however, that low density compositions of the present invention are comprised of at least 2 weight percent PPE based upon the weight of PPE and PS taken together. Compositions containing less than 2 weight percent PPE are considered to be primarily polystyrene compositions and do not generally exhibit the preferred property improvements associated with PPE/PS blends. It is well known that the addition of PPE to PS resin offers improvements in impact strength, flammability ratings, tensile strength and other mechanical properties. Conversely, polystyrene is typically blended with polyphenylene ether resins to offer better processability for many thermoplastic processes.

Typical PPE/PS blends useful in the practice of the present invention will be comprised of between from about 5 to about 95 percent and preferably from about 20 to about 80 percent by weight PPE and from about 95 to about 5 percent and preferably from about 80 to about 20 percent by weight PS based upon the weight of the two resins taken together.

During the blending step, it is contemplated that conventional additives may be incorporated into the resin mixture if desired. These include rubbery impact modifiers, flame retarding agents, stabilizers for thermal and color stability, antioxidants, processing aids, plasticizers, anti-static agents, reinforcing and extending fillers, pigments, mixtures of any of the foregoing and the like. Each of these may be utilized to a greater or lesser degree depending on the required final properties desired in the final product. Conventional surfactants and nucleants used in expanded polystyrene foams may also be utilized. Examples of these include zinc or tin stearates, maleates, fumarates and the like.

The blowing agents which may be utilized in the practice of this invention are generally volatile liquids. The blowing agents may comprise straight-chain, cyclic or halogen-substituted hydrocarbons. The preferred aliphatic hydrocarbon blowing agents will include aliphatic hydrocarbons. Examples include propane, isopropane, butane, isobutane, n-pentane, isopentane, neopentane, cyclopentane, pentene, hexane, heptane, octane and mixtures of any of the foregoing. Fluoro carbon blowing agents include trichlorofluoromethane ($CCl_3F$), dichlorodifluoromethane ($CCl_2F_2$), chlorodifluoromethane ($CHClF_2$)(HCFC-22), $CClF_2$-$CClF_2$ and mixtures of any of the foregoing. These are commercially available as Freon® 11, Freon® 12, Formacel®S and Freon® 114. Other halogenated hydrocarbon blowing agents include methylene chloride, chloroform, carbon tetrachloride and the like. Also contemplated are the HCFC's, e.g. dichlorotrifluoroethane (HCFC-123) ($CHCl_2CF_3$), dichlorotrifluoroethane (HCFC-123A) ($CHFClCClF_2$), chlorotetrafluoroethane (HCFC-124) ($CHClFCF_3$), tetrafluoroethane (HFC-134A) ($CH_2FCF_3$), dichlorofluoroethane (HCFC-141B)($CCL_2FCH_3$), chlorodifluoroethane (HCFC-142B)($CH_3CClF_2$), difluoroethane (HFC-152A)($CH_3CHF_2$) and the like. Other blowing agents contemplated for use in the present invention are acetone, methylethyl ketone, ethyl acetate, alcohols having from 1 to 5 carbon atoms, halogenated alcohols such as fluoroisopropanol and water.

It is preferred that the blowing agent be added in an amount of from about 2 to about 15 weight percent and more preferably from about 2 to about 8 weight percent based on the weight of the thermoplastic resin employed. The preferred blowing agent comprises n-pentane, isopentane, neopentane and mixtures thereof.

It is contemplated by the present invention to employ any conventional method to impregnate the resin with blowing agent. The blowing agent may be absorbed into the pellets through exposure to a saturated atmosphere of blowing agent. Alternatively a water/pellet suspension may be exposed to the blowing agents. These methods are described in Allen et al U.S. Pat. No. 4,727,093. Other methods are those described in the above-identified Frisch & Saunders. It is also possible to impregnate the blowing agent into the resin during extrusion or during polymerization. All such methods known to those skilled in the art are within the scope of the present invention.

DESCRIPTION OF THE PREFERRED EMBODIMENTS

The following specific examples illustrate the present invention. However, they are not to be construed to limit the claims in any manner whatsoever.

EXAMPLE 1

Polyphenylene ether (0.40 I.V.) and principally atactic polystyrene are compounded into micropellets. The micropellets are imbibed with blowing agent, pre-expanded and molded. For comparison blends of polyphenylene ether (0.46 I.V.) and PS micropellets are also tested. The lower I.V. polyphenylene ether composition is found to use a slightly lower steam pressure during molding, to have a shorter molding cycle and the molded part is found to contain less residual pentane than the comparative composition.

EXAMPLES 2-5

Polyphenylene ethers having instrinsic viscosities of 0.40 dl/g and 0.25 dl/g are blended with Huntsman PP738 principally atactic polystyrene beads in a weight ratio of 20 parts polyphenylene ether, to 80 parts polystyrene, and 50/50 respectively. The blends are compounded in a 30 mm Werner-Pfleiderer twin screw extruder. The polymer extrudate is pulled into thin strands and subsequently chopped into tiny particles, called "micropellets". The micropellets are then treated with an aqueous emulsion of n-pentane under elevated temperature and pressure using a small quantity of poly-vinyl alcohol as an emulsifying agent. In this step, about 8 to 10 weight percent of the n-pentane is imbibed into the resin causing a softening and transformation of the micropellets into substantially spherical beads, generally referred to as "pentane absorbed beads" or "PAB". The PAB are then repeatedly washed with tap water and dried at room temperature overnight. The dried PAB are foamed in an oven at about 130° C. for various lengths of time to produce expanded beads at about 2, 4 and 6 lbs/cu ft (PCF) density. The expanded beads are then molded into blocks measuring 1"×6"×10" using 35 psi steam. Cooling water is then applied after attaining an internal cavity pressure of 43 psi and 71 psi for the 20/80 and 50/50 blends, respectively. The mold is opened after the pressure dropped below 20 psi. Quantitative analysis of residual pentane levels in the expanded beads is carried out using gas chromatography. The results are set forth below in Table 1.

TABLE 1

| | RESIDUAL PENTANE CONTENT | | | | | |
|---|---|---|---|---|---|---|
| EXAMPLE | A* | 2 | 3 | B* | 4 | 5 |
| Composition | | | | | | |
| PPE, parts by weight | 20 | 20 | 20 | 50 | 50 | 50 |
| PS, parts by weight | 80 | 80 | 80 | 50 | 50 | 50 |
| I.V. PPE, dl/g | 0.46 | 0.40 | 0.25 | 0.46 | 0.40 | 0.25 |
| Weight Percent Pentane | | | | | | |
| 2 PCF | 2.8 | 3.3 | 1.5 | 4.4 | 4.5 | 0.9** |
| 4 PCF | 3.8 | 2.7 | 3.8 | — | 5.0 | 2.9 |
| 6 PCF | 3.2 | 2.3 | 2.2 | 4.7 | 4.8 | 4.4 |

*Comparative Example
**average value for duplicate samples
PPE = polyphenylene ether
PS = polystyrene
I.V. = intrinsic viscosity
PCF = nominal pounds per cubic foot The data in Table 1 show a general reduction in retained pentane levels with lower I.V. PPE resins. Although there is some scattering in the data, the most significant pentane reduction is found with ultra low I.V. (0.25) PPE/PS blends, especially at low density.

EXAMPLE 6-9

The foams produced in Examples 2-5 are evaluated for compression strength at 10 percent deflection. The results are set forth in Table 2 below.

TABLE 2

| | COMPRESSIVE STRENGTH AT 10 PERCENT DEFLECTION | | | | | |
|---|---|---|---|---|---|---|
| EXAMPLE | A* | 6 | 7 | B* | 8 | 9 |
| Composition | | | | | | |
| PPE, parts by weight | 20 | 20 | 20 | 50 | 50 | 50 |
| PS, parts by weight | 80 | 80 | 80 | 50 | 50 | 50 |
| I.V. PPE, dl/g | 0.46 | 0.40 | 0.25 | 0.46 | 0.40 | 0.25 |
| Weight Percent Pentane | | | | | | |
| 2 PCF | 29.2 | 24.9 | 23.9 | 36.6 | 38.1 | 33.6 |
| 4 PCF | 65.8 | 69.2 | 67.7 | 96.0 | 87.5 | 82.5 |
| 6 PCF | 135.6 | 123.7 | 120.1 | 160.1 | 173.3 | 160.4 |

*Comparative Example
PPE = polyphenylene ether
PS = polystyrene
I.V. = intrinsic viscosity
PCF = nominal pounds per cubic foot The data in Table 2 show very slight effects of the intrinsic viscosity of polyphenylene ether on compressive strength for each material molded at a particular density, indicating that ultralow I.V. polyphenylene ether has no deleterious effect on this important property. The expected trend of increasing compressive strength with density is also evident.

EXAMPLE 10

The procedure of Example 2 is repeated except poly (2,3,6-trimethyl-1,4-phenylene)ether is employed as the low I.V. PPE resin. A composition in accordance with the scope of the appended claims is produced.

EXAMPLES 11-13

The procedure of Example 2 is repeated except styrene-maleic anhydride copolymer, styrene-butadiene copolymer and styrene-acrylonitrile-butadiene terpolymer are substituted for the principally atactic polystyrene. Compositions in accordance with the scope of the appended claims are produced.

EXAMPLES 14-46

The procedure of Example 2 is repeated except that butane, isobutane, isopentane, neopentane, cyclopentane, pentene, CCl$_3$F, CCl$_2$F$_2$, CHClF$_2$, CCl$_2$F-CCl$_2$F, methylene chloride, carbon tetrachloride, HCFC-123, HCFC-123A, HCFC-124, HFC-134A, HCFC-141B, HCFC-142B, HFC-152A, carbon dioxide, water, nitrogen, air, acetone, ethyl acetate, methylethyl ketone, methanol, ethanol, propanol, isopropanol, fluoroisopropanol, butanol and pentanol are employed as blowing agents instead of n-pentane. Compositions in accordance with the scope of the appended claims are produced.

EXAMPLES 47-55

The procedure of Example 2 is repeated except that also added to the low I.V. PPE/PS blend are an impact modifier, flame retardant, lubricant, a pigment such as carbon black and titanium dioxide, process aid, plasticizer, antistatic agent and a mixture of all of the foregoing. Compositions in accordance with the scope of the appended claims are produced.

The above-mentioned patents, patent applications and publications are incorporated herein by reference.

Many variations of the present invention will suggest themselves to those skilled in the art in of light of the above-detailed description. For example a poly(2,6-dimethyl-co-2,3,6-trimethyl-1,4-phenylene)ether or a poly(2-methyl-6-ethyl-1,4-phenylene)ether may be employed as the low I.V. PPE resin. Further a wide range of polystyrene resins are contemplated, e.g. poly(alpha-methylstyrene), poly(nuclear-methylstyrene), poly(-para-methylstyrene), poly(para-tert-butyl styrene), polychlorostyrene, polydichlorostyrene, polybromostyrene, polydibromostyrene, styrene-acrylonitrile copolymer, high impact polystyrenes, and styrene-divinyl benzene copolymer and their copolymers and mixtures of any of the foregoing. Also useful in the present invention as blowing agents are any $C_1$-$C_5$ alcohols, chloroform, heptane, hexane, octane and mixtures thereof. All such obvious modifications are within the full intended scope of the appended claims.

We claim:

1. A method for reducing molding pressures and improving the diffusion rate of a blowing agent comprising:
   (i) compounding a composition comprising microparticles having an average diameter of less than about 0.05 inch, said microparticles comprising (a) a polyphenylene ether resin having an intrinsic viscosity of 0.40 dl/g or less; and optionally
(b) a polystyrene resin;
(ii) impregnating said composition with a blowing agent;
(iii) pre-expanding said composition; and
(iv) molding said pre-expanded composition.

2. A method as defined in claim 1 wherein said microparticles have an average diameter of less than about 0.0075 inch.

3. A method as defined in claim 1 wherein said polyphenylene ether resin comprises poly(2,6-dimethyl-1,4-phenylene)ether, poly (2,3,6-trimethyl-1,4-phenylene)ether, poly(2,6-dimethyl-co-2,3,6-trimethyl-1, 4-phenylene)ether or a mixture thereof.

4. A method as defined in claim 2 wherein said polyphenylene ether resin comprises poly(2,6-dimethyl-1,4-phenylene)ether.

5. A method as defined in claim 1 wherein said polyphenylene ether has an intrinsic viscosity of less than about 0.30 dl/g.

6. A method as defined in claim 5 wherein said polyphenylene ether has an intrinsic viscosity of from about 0.10 dl/g to about 0.30 dl/g.

7. A method as defined in claim 1 wherein said polystyrene resin is selected from the group consisting of principally atactic polystyrene, poly(alpha-methylstyrene), poly(nuclear-methylstyrene), poly(para-methylstyrene), poly(para-tert-butylstyrene), polymonochlorostyrene, polydichlorostyrene, polybromostyrene, polydibromostyrene, styrene-maleic anhydride copolymer, styrene-butadiene copolymer, styrene-acrylonitrile copolymer, styrene-acrylonitrile-butadiene terpolymer, styrene-divinylbenzene copolymer, high impact polystyrene, copolymers and mixtures of any of the foregoing.

8. A method as defined in claim 7 wherein said polystyrene resin comprises a styrene-maleic anhydride copolymer.

9. A method as defined in claim 7 wherein said polystyrene resin comprises principally atactic polystyrene.

10. A method as defined in claim 7 wherein said polystyrene resin comprises a polybromostyrene, a polydibromostyrene, or copolymers and mixtures thereof with other styrenic resins.

11. A method as defined in claim 7 wherein said polystyrene resin comprises high impact polystyrene.

12. A method as defined in claim 1 wherein said composition comprises from about 5 to about 95 parts by weight of a polyphenylene ether resin and from about 95 to about 5 parts by weight of a polystyrene resin based on the weight of the polyphenylene ether resin and the polystyrene resin compound.

13. A method as defined in claim 12 wherein said composition comprises from about 20 to about 80 parts by weight of a polyphenylene ether resin and from about 80 to about 20 parts by weight of a polystyrene resin based on the weight of the polyphenylene ether resin and the polystyrene resin combined.

14. A method as defined in claim 13 wherein said composition comprises about 50 parts by weight of a polyphenylene ether resin and about 50 parts by weight of a polystyrene resin based on the weight of the polyphenylene ether resin and the polystyrene resin combined.

15. A method as defined in claim 1 wherein said blowing agent is selected from the group consisting of straight-chain, branched, cyclic or halogenated hydrocarbons, chlorofluorocarbons, HCFC's, carbon dioxide, water, nitrogen, air, alcohols having from 1 to 5 atoms, halogenated alcohols, acetone, ethyl acetate, methylethyl ketone and mixtures of any of the foregoing.

16. A method as defined in claim 15 wherein said blowing agent comprises n-pentane, isopentane, cyclopentane, neopentane and mixtures thereof.

17. A method as defined in claim 15 wherein said HCFC's are selected from the group consisting of HCFC-22, HCFC-123, HCFC-123A, HCFC-124, HFC-134A, HCFC-141B, HCFC-142B, HFC-152A and mixtures of any of the foregoing.

18. A method as defined in claim 1 wherein said effective amount of blowing agent comprises from about 2 to about 15 weight percent based on the weight of the polyphenylene ether resin and polystyrene resin combined.

19. A method as defined in claim 18 wherein said effective amount of blowing agent comprises from about 2 to about 8 weight percent based on the weight of the polyphenylene ether resin and the polystyrene resin combined.

* * * * *